Patented Oct. 24, 1939

2,176,951

UNITED STATES PATENT OFFICE 2,176,951

PHENOL-BUTYRALDEHYDE RESIN

William J. Bannister, Terre Haute, Ind., assignor to Resinox Corporation, New York, N. Y., a corporation of Delaware No Drawing. Application September 27, 1937, Serial No. 165,893

8 Claims. (Cl. 260—53)

My invention relates to a process for the production of phenol-butyraldehyde condensation products, and more specifically to an improved process for the production of light colored condensation products from butyraldehyde and phenols.

Resinous materials have previously been produced by reacting butyraldehyde and phenol in the presence of an acid catalyst for relatively short periods of time but these products have been disadvantageously dark in color. The prior investigators have indicated that this condensation will not take place satisfactorily in the presence of alkaline catalysts, but I have now found that with relatively longer reaction time butyraldehyde and phenols will condense to form highly satisfactory resins which are much lighter in color, and otherwise more suitable for general commercial use than the products obtained by reacting butyraldehyde and phenol in the presence of an acid catalyst.

I have also found that the properties of the condensation product may be further improved by effecting the condensation reaction in a non-oxidizing atmosphere, such as may be obtained by displacing the air from the reaction vessel with an inert gas. By carrying out the reaction in the presence of an alkaline catalyst and in an non-oxdizing atmosphere, I am able to secure condensation products which are vastly improved in color and other properties over the products previously obtainable from these raw materials.

In carrying out my invention a mixture of butyraldehyde and phenol, or a homologue thereof, together with an alkaline catalyst is reacted at an elevated temperature over a period of hours, preferably in a non-oxidizing atmosphere. I prefer to employ a molecular excess of the phenol in order to secure a fusible resin, but my improved process is applicable to the production of phenol-butyraldehyde condensation products irrespective of the proportions of the reactants. The butyraldehyde, phenol, and catalyst may be introduced into a reaction vessel equipped with a reflux condenser and the reaction may be effected at the reflux temperature of the mixture. The progress of the reaction may be followed by determining at intervals the melting point of the resin. At the conclusion of the reaction the catalyst may be removed by neutralizing and washing and any unreacted phenol or butyraldehyde may then be removed by steam distillation.

The products produced in accordance with this process constitute light colored resins which may be employed for any of the known uses of similar resinous materials. If fusible resins are produced these may be employed in conjunction with suitable organic solvents for the preparation of spirit varnishes, cements, and the like, or the resins may be further reacted with reactive methylene compounds to produce insoluble infusible resins, or other modified forms of the original resin.

My invention may be illustrated by the following example:

Example

A mixture of 188 parts by weight of phenol, 100 parts of butyraldehyde, and 9.4 parts of sodium hydroxide was refluxed in an atmosphere of nitrogen for a period of approximately 21 hours. At the conclusion of the reaction 130 parts by weight of benzol was added and the sodium hydroxide in the resulting solution was neutralized by the addition of sufficient hydrochloric acid to make the mixture slightly acid to Congo red paper. The product was next washed with water until neutral and steam distilled at an elevated temperature to remove unreacted materials. A yield of 117 parts by weight of a clear light colored resin was thus obtained.

It is to be understood, of course, that the above example is illustrative only and is not to be construed as limiting the scope of my invention. Various equivalent materials may be substituted for those specified in the example, and the proportions or reaction conditions may be varied depending on the nature of the desired product. In place of phenol, other phenolic materials such as ortho, meta, or paracresol, or the xylenols, or mixtures of these materials, may be employed. Various other alkaline condensation catalysts such as potassium hydroxide, calcium hydroxide, and the like, may be substituted for the sodium hydroxide employed in the example. The ratio of reactants and reaction time may be varied within relatively wide limits, but for the production of fusible resins I prefer to employ a molecular proportion of phenolic body to aldehyde ranging from about two to one to about two to three and to employ a reaction time from about 15 hours to about 25 hours. If the reaction is carried out in a non-oxidizing atmosphere this may be effected by displacing the air with other inert gases such as hydrogen, helium, methane, ethane, etc., as well as by the use of nitrogen, as specified in the above example. Various other equivalents and modifications of procedure which would naturally occur to those skilled in the art are to be considered within the scope of my invention.

My invention now having been described, what I claim is:

1. A process comprising reacting in the presence of an alkaline catalyst a mixture consisting of butyraldehyde and a phenol until there is produced a resinous condensation product lighter in color than a butyraldehyde-phenol resinous condensation product similarly produced in the presence of an acid catalyst.

2. A process comprising reacting in the presence of an alkaline catalyst and in a non-oxidizing atmosphere a mixture consisting of butyraldehyde and a phenol until there is produced a resinous condensation product lighter in color than a butyraldehyde-phenol resinous condensation product produced in the presence of an acid catalyst.

3. A process comprising reacting in the presence of sodium hydroxide and in an atmosphere of nitrogen a mixture consisting of butyraldehyde and a phenol until there is produced a resinous condensation product lighter in color than a butyraldehyde-phenol resinous condensation product produced in the presence of an acid catalyst.

4. A process comprising reacting in the presence of an alkaline catalyst and in a non-oxidizing atmosphere a mixture consisting of butyraldehyde and a molecular excess of phenol until there is produced a fusible resinous condensation product lighter in color than a butyraldehyde-phenol resinous condensation product produced in the presence of an acid catalyst.

5. A butyraldehyde-phenol resinous condensation product resulting from the reaction of a mixture consisting essentially of butyraldehyde and a phenol in the presence of an alkaline catalyst, which is lighter in color than a butyraldehyde-phenol resinous condensation product similarly produced in the presence of an acid catalyst.

6. A butyraldehyde-phenol resinous condensation product resulting from the reaction of a mixture consisting essentially of butyraldehyde and a phenol in the presence of an alkaline catalyst and in a non-oxidizing atmosphere, which is lighter in color than a butyraldehyde-phenol resinous condensation product produced in the presence of an acid catalyst.

7. A butyraldehyde-phenol resinous condensation product resulting from the reaction of a mixture consisting essentially of butyraldehyde and phenol in the presence of sodium hydroxide, in an atmosphere of nitrogen, lighter in color than a butyraldehyde-phenol resinous condensation product produced in the presence of an acid catalyst.

8. A butyraldehyde-phenol resinous condensation product resulting from the reaction of a mixture consisting essentially of butyraldehyde and a molecular excess of a phenol in the presence of an alkaline catalyst and in a non-oxidizing atmosphere, which is fusible and lighter in color than a butyraldehyde-phenol resinous condensation product produced in the presence of an acid catalyst.

WILLIAM J. BANNISTER.